No. 752,660. Patented February 23, 1904.

UNITED STATES PATENT OFFICE.

MARY AMANDA DILLARD, OF SELMA, ALABAMA.

COMPOSITION OF MATTER.

SPECIFICATION forming part of Letters Patent No. 752,660, dated February 23, 1904.

Application filed October 31, 1903. Serial No. 179,264. (No specimens.)

*To all whom it may concern:*

Be it known that I, MARY AMANDA DILLARD, of Selma, in the county of Dallas and State of Alabama, have invented a new and useful Composition of Matter to be Used as an Icing for Cakes, Pastries, and other Food, of which the following is a specification.

My composition consists of the following ingredients, combined in the proportions stated, to wit: pulverized sugar, one pound; gum-arabic, two ounces; cream of tartar, one-half ounce.

The ingredients are thoroughly mingled and mixed with cold water, sufficient water being added to make the mass of the consistency of cake-batter.

To make an icing or frosting which is very white and snowy, the beaten white of egg can be used instead of the water, or if a golden effect is desired the yolk of the egg can be used.

For general use the composition is put up in powdered form with the parts ready mixed, and water or egg is added when the composition is to be used.

The icing can be flavored or colored to suit the taste, and when it is to be used it is applied to the cake or other article when the cake is cold, and after the icing is applied it and the article on which it is put are set aside till the icing becomes fixed, which it does very quickly.

The object of this invention is especially to produce an icing which can be quickly mixed and applied and which will set without cracking and, further, which can be used without the necessity of heating or baking.

What I claim, and desire to secure by Letters Patent of the United States, is—

1. The herein-described composition of matter, consisting of sugar, gum-arabic and cream of tartar combined in substantially the proportions stated.

2. The herein-described composition of matter, for an icing, consisting of powdered sugar, gum-arabic, cream of tartar and egg combined substantially as stated.

In testimony whereof I have signed my name to the specification in the presence of the subscribing witnesses.

MARY AMANDA DILLARD.

Witnesses:
HUGH MALLORY,
CHAS. L. HARRIS,
JULIA A. ANDREWS.